United States Patent [19]

Cole

[11] Patent Number: 5,229,552
[45] Date of Patent: Jul. 20, 1993

[54] METHOD AND APPARATUS FOR THE DOWNHOLE MEASUREMENT OF ELASTIC ROCK PROPERTIES

[75] Inventor: Jack H. Cole, Ponca City, Okla.

[73] Assignee: Conoco Inc., Ponca City, Okla.

[21] Appl. No.: 886,988

[22] Filed: May 21, 1992

[51] Int. Cl.$^5$ .............................................. G01V 1/40
[52] U.S. Cl. .................................. 181/102; 181/108; 181/112; 367/13; 367/30; 367/86; 73/152
[58] Field of Search ............... 181/108, 102, 112, 106; 367/13, 30, 86, 911; 73/151, 152

[56] References Cited

U.S. PATENT DOCUMENTS

| | | | |
|---|---|---|---|
| 2,244,484 | 6/1941 | Beers | 181/0.5 |
| 4,480,480 | 11/1984 | Scott et al. | 364/506 |
| 4,783,742 | 11/1988 | Peters | 364/422 |
| 4,802,144 | 1/1989 | Holzhausen et al. | 367/35 |
| 4,874,061 | 10/1989 | Cole | 181/106 |
| 4,903,245 | 2/1990 | Close et al. | 367/81 |
| 4,932,003 | 6/1990 | Winbow et al. | 367/75 |
| 4,958,125 | 9/1990 | Jardine et al. | 73/151 |

Primary Examiner—J. Woodrow Eldred

[57] ABSTRACT

A method and apparatus by which elastic properties of rock formations are determined includes a downhole logging device which has two internal accelerometers mounted within to measure the acceleration of the device. A reference displacement of the device is determined by measuring the acceleration outside the borehole while the device is suspended in air. The output of the accelerometers is measured in the borehole. Integrating the acceleration outputs of these accelerometers twice yields the displacement in the borehole. Changes in the displacement of the device are indicative of various elastic properties of formations surrounding the borehole. Using two accelerometers to determine displacement allows the continuous logging of Young's modulus and other elastic properties of rocks surrounding a well bore. In an alternate embodiment, geophones are used to measure the velocity of the device and their outputs are integrated once to yield displacement.

4 Claims, 2 Drawing Sheets

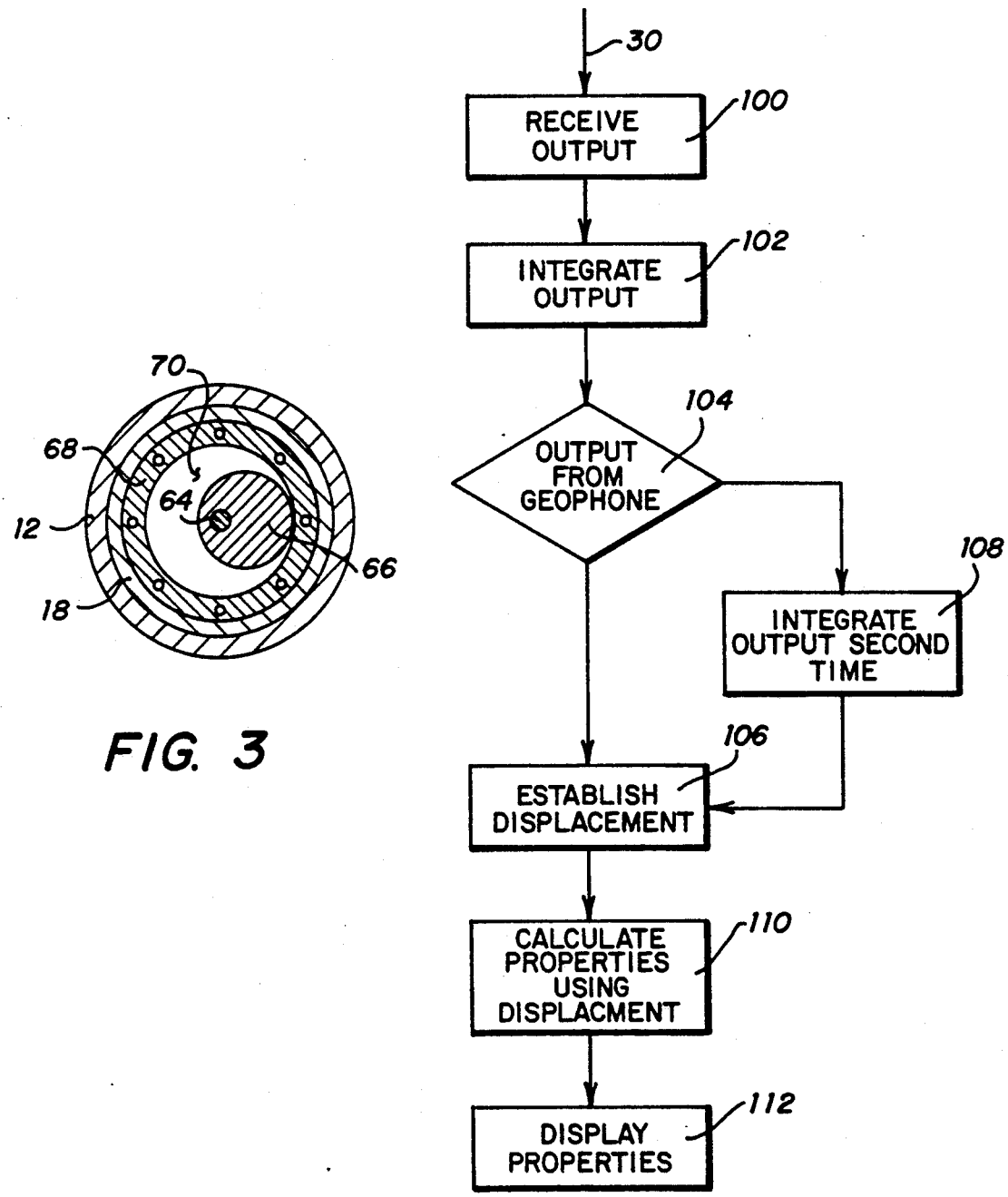

METHOD AND APPARATUS FOR THE DOWNHOLE MEASUREMENT OF ELASTIC ROCK PROPERTIES

BACKGROUND OF THE INVENTION

1. Field of the Invention

The present invention pertains to methods and apparatus used in oil exploration technology and more particularly to the methods and apparatus used to continuously measure the elastic properties of rocks located in subsurface formations.

2. Related Prior Art

Identification of subsurface rock properties is always important in oil well production since properties such as porosity and permeability can control oil recovery. Prior art has used correlations based upon acoustic travel times and bulk density to measure elastic rock properties such as bulk compressibility, shear modulus, Young's modulus, and Poisson's ratio. Rock properties are usually measured through the use of small samples that are taken from the well location and transported to a laboratory. However, laboratories cannot accurately measure rock properties in their original in situ conditions with the small rock samples that are usually transported to the laboratory.

Examples of patents that are indicative of prior art methods and apparatus for determining various rock properties are as follows.

U.S. Pat. No. 4,874,061, "Downhole Orbital Seismic Source" (Cole), relates to an apparatus for simultaneously generating elliptically polarized seismic shear waves and compression waves downhole for coupling energy through the fluid into the borehole wall. The apparatus includes an elongate frame for support in the borehole and the frame includes a drive means energizable to impart an orbital motion to at least a portion of the frame to generate an orbital shear wave.

U.S. Pat. No. 4,802,144, "Hydraulic Fracture Analysis Method" (Holzhausen et al.) relates to a method which uses a principle that the growth of a hydraulic fracture increases the period of free oscillations in the well connected to the fracture. Simultaneously, the decay rate of free oscillations decreases. The properties of force oscillations in a well also change during fracture growth. All of these effects result from the changing impedance of the hydraulic fracture that intersects the well. Hydraulic fracture impedance can be defined in terms of the hydraulic resistance and the hydraulic capacitance of a fracture. Fracture impedance can be determined directly by measuring the ratio of down hole pressure and flow oscillation. The fracture impedance can also be measured indirectly from well head impedance measurements using impedance transfer functions. Well head pressure measurements can also be used to evaluate fracture impedance by comparing them to pressure oscillations computed with hydraulic models that include fractures with different impedances. Since impedance is a function of fracture dimensions and the elasticity of the surrounding rock, impedance analysis can be used to evaluate the geometry of the fracture by analyzing the data which results from free and forced oscillations in the well, and looking for a match between the data and theoretical models of projected shapes of the fracture.

U.S. Pat. No. 2,244,484, "Method of and Means for Analyzing and Determining the Geologic Strata Below the Surface of the Earth" (Beers) relates to a method for seismically determining physical characteristics of subsurface formations which includes generating a sound in the vicinity of a formation. This sound is then transmitted into the formation by means of an electrical acoustic generator. The electrical quantities of which, measured at its terminals, depend upon the extent to which the power delivered to the generator is absorbed by the surrounding or adjacent formations. The variations in the measured electrical quantities indicate changes in the physical and lithologic characteristics of the various formations. These measurements are recorded by a graphical plot or log, or other means, at each successive position in the geologic section as a basis of correlation. This patent provides a method of seismically determining changes in physical characteristics of geologic strata which includes, setting up sound waves in the immediate vicinity of the formation or stratum, measuring the velocity of propagation of the sound through the formation and indicating the velocity at the surface. The characteristics of the formation may be readily determined by the time required for the waves to travel through the formation.

U.S. Pat. No. 4,802,144, (Holzhausen et al.) uses the measurement of hydraulic impedance to determine rock properties and U.S. Pat. No. 2,244,484, (Beers) measures downhole impedance (impedance log) to determine properties by determining propagation velocity. These two patents merely illustrate the state of the art in measuring rock properties in situ.

SUMMARY OF THE INVENTION

The present invention provides a method and apparatus by which elastic properties of rock formations are determined continuously in situ. Two internal accelerometers are mounted within a downhole logging tool to measure the acceleration of the device. A reference displacement of the device is determined by measuring the acceleration outside the borehole while the device is suspended in air. The output of the accelerometers is measured in the borehole. Integrating the acceleration outputs of these accelerometers twice yields the displacement in the borehole. When the displacement of the device is known, various elastic properties of the surrounding formation can be determined. The present invention, through the use of two accelerometers to determine displacement, allows the continuous logging of Young's modulus and other elastic properties of rocks surrounding a well bore. In an alternative embodiment, geophones are used to measure the velocity of the device and their outputs are integrated once to yield displacement.

BRIEF DESCRIPTION OF THE DRAWINGS

FIG. 3 is a cross section of the orbital seismic source of FIG. 2 taken along lines 3—3.

FIG. 4 is a block diagram of a flow chart of the basic method of the present invention.

DESCRIPTION OF THE PREFERRED EMBODIMENT

Figure 1:
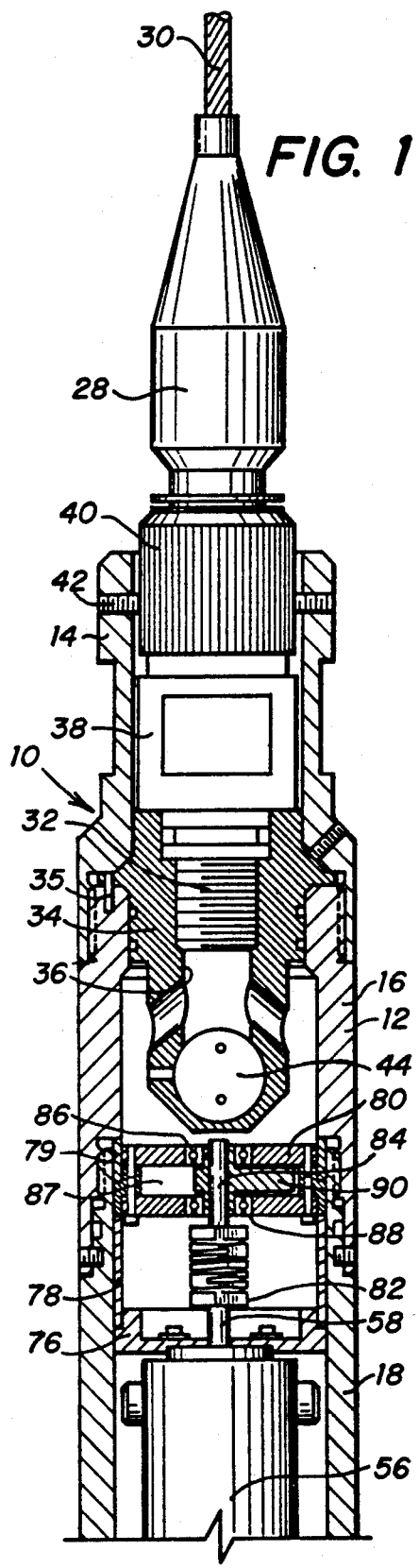
FIG. 1 is a vertical cross section of the upper portion of an orbital seismic source incorporating two accelerometers.

FIG. 1 illustrates a downhole orbital seismic source of the type which can be used in cross well seismic experiments. This source concept has been adapted for use as a downhole direct fracture detecting tool. The present invention describes a further extension of this source concept to the direct measurement of the elastic properties of rock surrounding a well bore. A logging tool version of this idea would attach to and draw power from a standard seven conductor wire line as is commonly used in well logging operations.

Referring now to FIG. 1, a form of an orbital shear wave vibrator which utilizes the concept of rotation of an unbalanced mass within a vibrator with seismic energy generation to orbital movement of the vibrator outer wall is illustrated. The orbital shear wave vibrator 10 includes a tubular housing 12, which in this application is of as low a value of mass as is practical. Tubular housing 12 is formed of sections consisting of a crown sleeve 14 that is threadedly secured in sealed relationship to an upper sleeve 16 which is threadedly connected in sealed relationship to a middle sleeve 18. Middle sleeve 18 is also threadedly received within a bottom sleeve 20 which is threadedly engaged with a bottom cap sleeve 22 and cap 24 which extends a descending bail 26.

A connector collar 28 having a multiple conductor logging cable 30 is connected into source 10 in a sealed relationship through mating connector 38 by means of a threaded post 32 which is an integral part of connector 38. A mass body of revolution 34 is adapted to be seized upon the threaded end of collar sleeve 14 to upper sleeve 16 while defining a threaded radial bore 36 for receiving the threaded post 32. Threaded post 32 extends through connector 38 forming a sealed compartment into secure threaded engagement with threaded collar 40 secured by set screws 42 within the upper portion of collar sleeve 14. Thus, the mass body 34 not only provides a rigid connection to the upper cable assembly, but it also provides support structure for at least one motion sensor 44, which may be either an accelerometer to detect acceleration or a geophone to detect velocity. Motion sensor 44, through selective rotation of mass body 34, is maintained in a selected transverse alignment. Dowel pin 35 prevents rotation of body 34 with respect to upper sleeve 16.

Figure 2:
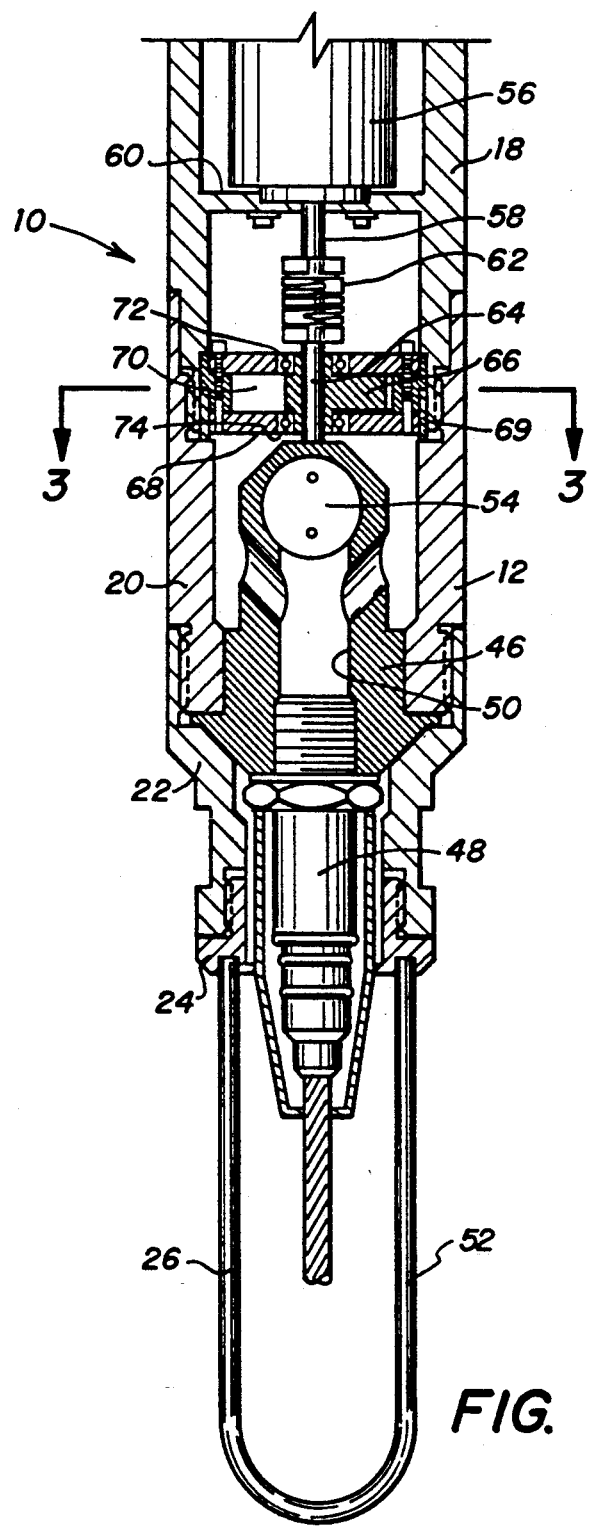
FIG. 2 is a vertical cross section of the lower portion of the orbital seismic source of FIG. 1.

The lower portion of source 10 illustrated in FIG. 2 is similarly constructed as a mass body 46 is secured upon threaded assembly of cap sleeve 22 and lower sleeve 20. A cable connector 48 is threadedly received within a threaded bore 50 of mass body 46 to provide electrical connection through to the lower cable 52. A lower cable assembly 52 may be used in certain configurations but not all, and a suitable plug member would be utilized otherwise. Bail 26 is available for suspension of selected stabilizing weights. The mass body 46 also retains at least one motion sensing device, such as motion sensor 54, in designated azimuthal direction for use as will be further described below. Orientation is maintained by an index pin (not shown).

Middle sleeve 18 is adapted to contain a variable speed AC or DC electric motor 56 having a double ended shaft 58 to provide rotational drive power to the eccentric rotors. Motor 56 contains a built in encoder (not shown), to provide feedback for use in speed and phase control. The underside of motor 56 is rigidly secured to a transverse annular flange 60 as rotary shaft 58 is secured to a flexible coupling 62 having an output shaft 64 that is secured to an eccentric rotor 66. A circular housing member 68 is suitably secured at the juncture of middle sleeve 18 and lower sleeve 12 by spacer 69 to define a cylindrical cavity 70. A pair of axially aligned bearings 72 and 74 secured in housing 68 provide rotational support to the eccentric rotor 66. As shown in FIG. 2, eccentric rotor 66 is a circular disk with off center drive point as at shaft 64. Other forms of eccentric mass rotors could be used, however, the preferred embodiment of this form as a compromise to provide high mass eccentricity and reduced air drag.

Referring now to FIG. 2, a similar structure is employed at the upper end (FIG. 1), as motor 56 is secured to annular flange 76. A cylindrical spacer 78 is secured in support beneath a suitable cylindrical housing 80 which is further secured by spacer 79 at the threaded juncture of upper sleeve 16 and middle sleeve 18. The upper end of rotary shaft 58 is connected through a flexible coupling 82 which provides output on shaft 84 that is secured to an eccentric rotor 90. Rotor 90 is retained within upper and lower axial bearings 86 and 88. The housing 80 defines a cylindrical void 87 to rotate therein. The eccentric disks 90 and 66 are key connected to respective shafts 84 and 64 in like phase or radial alignment.

In operation, the orbital shear wave source 10 is suspended in a fluid filled borehole (not shown), at a designated position and the outer cylindrical walls of frame housing 12 are in energy coupled relationship to the borehole wall. If the borehole is liquid filled, the source effectively couples through the liquid to the borehole wall. If the borehole is gas filled, the source maybe clamped to the borehole wall by any of several well known clamping means. In phase rotation of the eccentric disks 90 and 66 by the motor 56 bring about a reactive orbital motion of the frame housing mass 12 which results in an orbital shear wave being coupled into the borehole wall for propagation outward and upward. Compression seismic waves, as previously described, are also generated. Two motion sensors 44 and 54 are mounted in identical orientation proximate opposite ends of the frame housing 12, and these provide output control signals for use variously in monitoring the source output signal, indexing rotation of the source, detection of replica signals, etc. Additional pairs of motion sensors, such as pair orientated ninety degrees with respect to motion sensors 44 and 54 can easily be added.

A downhole orbital seismic source, which uses rotating eccentric weights, is essentially a constant displacement device, the Displacement d is expressed by the equation $$d = \frac{W_e e}{W_T}$$

where:
$W_e$ = weight of rotating eccentric
$W_T$ = Total weight
e = Eccentricity of rotating weight and
d = Amplitude of displacement of the center of gravity of the entire device.

The force produced by the rotating eccentric weight has a magnitude:

$$F = \frac{W_e}{g} \omega^2 e$$

where:
$\omega$ = the angular frequency in radians per unit time and g = the gravitational constant.

At a particular frequency $\omega$, the velocity v of the orbiting center of gravity has a magnitude $v=\omega e$. The power required to rotate $W_e$ at speed $\omega$ is a product of the force F and velocity v. Additional power is needed to overcome bearing friction and wind drag.

Displacement d occurs with the orbital source suspended in air. When the source is lowered into a liquid-filled borehole, the amplitude of the displacement is reduced due to the loading effect of the surrounding formation. If the formation has anisotropic elastic properties, the normally circular motion of the source orbit is also modified or distorted. The amount of displacement amplitude reduction is related to the elastic properties of the formation material surrounding the well bore.

Displacement x may be differentiated once with respect to time, dx/dt, to obtain distance per unit of time or velocity. Differentiating velocity with respect to time, dv/dt, gives the change in velocity with respect to time or the acceleration. Conversely, integrating acceleration with respect to time provides the velocity, while integrating velocity with respect to time yields the position or displacement.

Displacement amplitude can be obtained from motion sensors 44 and 54 of FIG. 1 when accelerometers or geophones are used. Integrating the outputs of accelerometers, which measures acceleration, twice yields displacement. Integrating the outputs of geophones, which measures velocity, once also yields displacement.

FIG. 4 illustrates a flow chart of the method of the present invention in block form. One line of logging cable 30 provides the input to block 100 where inputs are received from motion sensors 44 and 54. At block 102 the outputs received are integrated. At block 104 a determination is made as to whether the output is from a geophone. If the output is from a geophone, integrating the output once provides a value representing the displacement and the displacement is established at block 106. If the output is not from a geophone but an accelerometer, the output if integrated a second time at block 108 and the displacement is established at block 106. Once the displacement is established, various properties can be calculated at block 110.

Formulas that define the elastic properties of interest and the mathematical relationships among these properties are well known in the art. Some of these linearly elastic properties and relationships are listed below for reference. It is assumed that the fundamental concepts of stress and unit strain commonly described in basic engineering texts are understood. For materials which obey Hook's law, axial stress is proportional to unit axial strain. The constant of proportionality E is often called Young's Modulus, with units of force per unit area. Similarly, shear stress is proportional to angular unit strain and the constant of proportionality M is usually referred to as the Shear or Rigidity Modulus. The units of M are force per unit area. M is related to E by the equation:

$$M = \frac{E}{2(1+\sigma)}$$

where Poisson's Ratio $\sigma$ is defined as the absolute value of axial unit strain divided by the absolute value of transverse unit strain.

Compressibility of an elastic material is defined as the change in volume dV of a unit volume V per change in surrounding pressure dP. A more convenient engineering term is Bulk Modulus $\beta$, which is the reciprocal of compressibility and is expressed by the equation:

$$\beta = \frac{V\,dP}{dV}$$

with units of force per unit area.
Also:

$$\beta = \frac{E}{3(1-2\sigma)}$$
$$= \frac{\lambda(1+\sigma)}{3\sigma}$$
$$= \lambda + \frac{2M}{3}$$

where Lame's constant $\lambda$ is given by:

$$\lambda = \beta - \frac{2M}{3}$$

Some of the equations relating acoustic velocities, mass density $\rho$ and the elastic moduli are also important. For example:

$$\rho V_p^2 = \beta + \frac{4M}{3}$$

and $$\rho V_s^2 = M$$

where $V_p$ and $V_s$ are the compression and shear wave velocities respectively.

Although the proceeding relationships are all based upon linear elasticity, the measurement concept described herein may also be applied where the rock properties are nonlinear.

Most equations include three properties, so it is necessary to know or measure two properties to determine the third by use of the equations. Through the calculations performed at block 110, the properties of the rocks may then be displayed at block 112 and appropriate actions may be taken based upon these properties, such as perforating the well casing at depths which indicate high porosity, etc.

Two significant experiments have been performed which confirm that the orbital source couples strongly through the borehole liquid into the surrounding formation. The first involved mounting geophones to the sides of a simulated well bore and then noting that the output signals from these phones were in phase with the outputs from geophones mounted inside the orbiting source and also that the amplitude of the signal from the source geophones decreased significantly as the orbiting source was lowered into the simulated well bore.

The second experiment showed that the normally circular orbit of the source becomes elliptical when the source enters an anisotropic region of a well bore (such as is caused by fracturing). This experiment also showed that when the azimuthal orientations of cross polarized geophones in the source known, the azimuth of vertical fractures intersecting the well bore can be determined.

One or more empirical relationships, which relate orbital source variables such as displacement, driving power, and frequency to rock properties such as shear modulus or Young's modulus, can be established through suitable laboratory experiments and calibration procedures. Rock properties of formations surrounding several test wells can be accurately determined from measurements made on the core samples taken during the drilling of those wells.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What I claim is:

1. A method by which elastic properties of rock formations surrounding a well bore are determined using an energized downhole device comprising the steps of:
   providing an adjustable frequency drive means to produce lateral motion in said well bore;
   providing at least two internal accelerometers mounted within the downhole device to measure the acceleration of the device;
   measuring a reference displacement of the device by measuring the acceleration outside the well bore while the device is suspended in air;
   measuring the output of the accelerometers in the borehole;
   integrating the acceleration outputs of said accelerometers twice to obtain the displacement in the well bore; and
   determining changes in the displacement of the device as indicative of various elastic properties of formations surrounding the borehole.

2. The method according to claim 1 wherein the step of determining changes in the displacement includes the step of:
   using said two accelerometers to determine displacement to log Young's modulus continuously.

3. A method by which elastic properties of rock formations surrounding a well bore are determined using an energized downhole device comprising the steps of:
   providing an adjustable frequency drive means to produce lateral motion in said well bore;
   providing at least two internal geophones mounted within the downhole device to measure the velocity of the device;
   measuring a reference displacement of the device by measuring the velocity outside the well bore while the device is suspended in air;
   measuring the output of said geophones in the borehole;
   integrating the outputs of said geophones to obtain the displacement in the well bore; and
   determining changes in the displacement of the device as indicative of various elastic properties of formations surrounding the borehole.

4. The method according to claim 3 wherein the step of determining changes in the displacement includes the step of:
   using said two geophones to determine displacement to log Young's modulus continuously.

* * * * *